United States Patent [19]

Yamamoto

[11] Patent Number: 4,747,615
[45] Date of Patent: May 31, 1988

[54] SUSPENSION CONTROL METHOD

[75] Inventor: Yukio Yamamoto, Susono, Japan

[73] Assignee: Toyota Jidosha Kabushiki Kaisha, Japan

[21] Appl. No.: 21,260

[22] Filed: Mar. 3, 1987

[30] Foreign Application Priority Data

Mar. 6, 1986 [JP] Japan .................................. 61-50045

[51] Int. Cl.⁴ ............................................. B60G 17/00
[52] U.S. Cl. .................................. 280/707; 280/6 R; 280/DIG. 1; 364/424
[58] Field of Search ........ 280/707, 6 R, 6 H, DIG. 1; 180/41; 364/424

[56] References Cited

U.S. PATENT DOCUMENTS

| 4,456,087 | 6/1984 | Lang et al. | 180/142 |
| 4,506,909 | 3/1985 | Nakashima et al. | 280/707 |
| 4,635,959 | 1/1987 | Nakano et al. | 280/707 |

FOREIGN PATENT DOCUMENTS

| 0133589 | 8/1984 | European Pat. Off. . |
| 0166313 | 1/1986 | European Pat. Off. . |
| 2251451 | 6/1975 | France . |
| 2313224 | 12/1976 | France . |
| 59-23712 | 2/1984 | Japan . |
| 59-120509 | 7/1984 | Japan . |
| 1450765 | 9/1976 | United Kingdom . |

Primary Examiner—Kenneth R. Rice
Attorney, Agent, or Firm—Parkhurst & Oliff

[57] ABSTRACT

A suspension control method for controlling suspensions equipped with variable damping force shock absorbers. First, an ideal movement pattern for restoring the sprung mass from a local highest or lowest position to a neutral position is previously determined. After the sprung mass has attained its local highest or lowest position, the control amount for altering the damping force of the shock absorber is successively calculated so that the sprung mass actually follows the ideal movement pattern. As a result, the sprung mass in its local lowest or highest position can swiftly returned to the neutral position in a semi-cycle.

6 Claims, 11 Drawing Sheets

FIG. 5

| | A0(XO^k) | T(XO^k) | T1(XO^k) | T2(XO^k) | A1(XO^k) | V1(XO^k) | X1(XO^k) | λ1(XO^k) | λ2(XO^k) |
|---|---|---|---|---|---|---|---|---|---|
| XO^1 | A0(XO^1) | T(XO^1) | T1(XO^1) | T2(XO^1) | A1(XO^1) | V1(XO^1) | X1(XO^1) | λ1(XO^1) | λ2(XO^1) |
| XO^2 | A0(XO^2) | T(XO^2) | T1(XO^2) | T2(XO^2) | A1(XO^2) | V1(XO^2) | X1(XO^2) | λ1(XO^2) | λ2(XO^2) |
| XO^3 | A0(XO^3) | T(XO^3) | T1(XO^3) | T2(XO^3) | A1(XO^3) | V1(XO^3) | X1(XO^3) | λ1(XO^3) | λ2(XO^3) |
| XO^4 | A0(XO^4) | T(XO^4) | T1(XO^4) | T2(XO^4) | A1(XO^4) | V1(XO^4) | X1(XO^4) | λ1(XO^4) | λ2(XO^4) |
| ----- | ----- | ----- | ----- | ----- | ----- | ----- | ----- | ----- | ----- |
| XO^n | A0(XO^n) | T(XO^n) | T1(XO^n) | T2(XO^n) | A1(XO^n) | V1(XO^n) | X1(XO^n) | λ1(XO^n) | λ2(XO^n) |

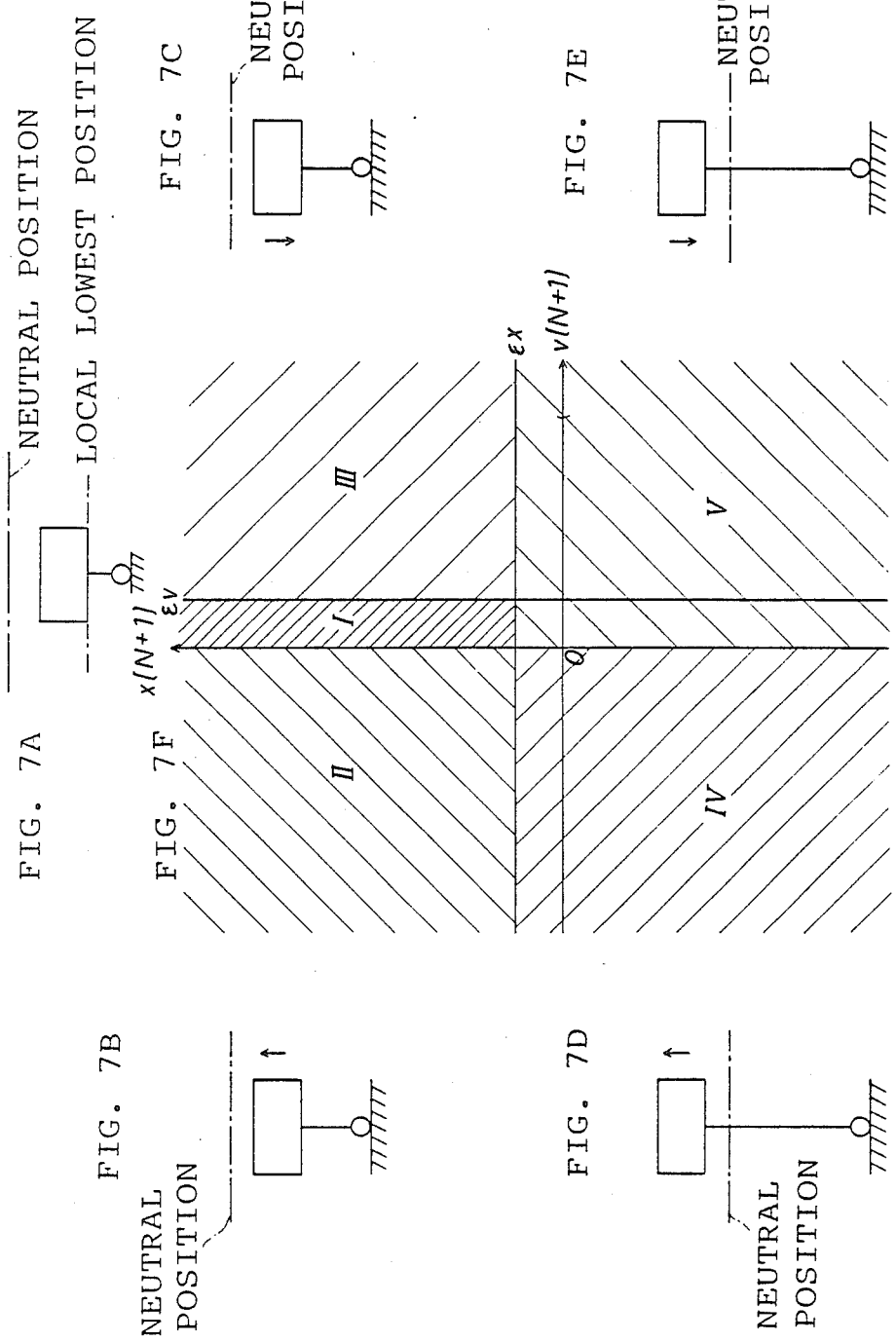

SUSPENSION CONTROL METHOD

BACKGROUND OF THE INVENTION

This invention relates to a suspension control method and more particularly to a method for controlling suspensions by altering the damping force of shock absorbers installed in a suspension system of a vehicle.

Generally, a suspension is formed between a vehicle body (a sprung mass) and a wheel (an unsprung mass) to connect the body and the wheel and also to improve riding comfort by absorbing shocks to the vehicle body. Such a suspension generally includes a coil spring and a shock absorber for altering damping force so as to appropriately damp the vibration of the sprung mass.

In conventional suspension control method, the damping force of the shock absorber is altered in response to the driving condition of the vehicle for the purpose of improving maneuverability and riding comfort of the vehicle. For example, such suspension control methods have been introduced in prior arts as set forth below. One is "Air Suspension System" (Japan Unexamined Patent Application No. Sho 59-23712) wherein the characteristics of an air suspension are altered in response to the condition of the vehicle and the road surface. Another is "Damping Force Controller for a Shock Absorber Installed in a Suspension System of a Vehicle" (Japan Unexamined Patent Application No. Sho 59-120509) wherein the damping force of the shock absorber is set to a higher value when the vehicle goes around a curve so as to reduce the rolling rate and thus to decrease the overall rolling angle of the vehicle body, while on the other hand, when the vehicle returns to make a straight drive, the damping force is set to a lower value so as to restore the normal attitude of the vehicle.

SUMMARY OF THE INVENTION

The above-mentioned prior arts have some problems as set forth below. For example, when the damping force of the shock absorber is altered to a lower value, the sprung mass in its local highest or local lowest position shakes or oscillates in several cycles as shown in the dotted line 71 in FIG. 4A while it is gradually restored to a neutral position (a position of the sprung mass when the vehicle is stationary). In this case, therefore, the riding comfort is deteriorated due to the uncomfortable shaking. On the other hand, if the damping force of the shock absorber is altered to a larger value, it takes a long time for the sprung mass to be restored to the neutral position from its local highest or local lowest position as shown in the two-dot chain line 72 in FIG. 4A even if the uncomfortable shaking can be damped. Moreover, if another impact is exerted to the unsprung mass while the sprung mass is restoring to the neutral position, passengers feel a hard shock, thus riding comfort is deteriorated.

Accordingly, the object of the present invention is to provide an improved suspension control method and apparatus which enables the maintenance of riding comfort by appropriately altering the damping force of the shock absorber.

To achieve this object, the suspension control method of this invention comprises a step of predetermining various movement patterns each depicting a movement of the sprung mass of the vehicle from the time point when the sprung mass attains its local highest or lowest position to the time point when the sprung mass reaches its neutral position; a step of sequentially generating a control signal for altering the damping force of the shock absorber so that the sprung mass traces one of the predetermined movement patterns after the sprung mass attains its local highest or lower position; and a step of controlling the shock absorber in response to the control signal.

For the execution of the above-mentioned steps, it is necessary to predetermine a movement pattern of the sprung mass for restoring the sprung mass from its local highest or local lowest position to the neutral position. For example, it is possible to preset a function x(t) which indicates an ideal movement of the sprung mass.

When the vehicle runs on a road, the processes as shown in the flow chart of FIG. 1 are executed.

At step P1, it is determined whether or not the sprung mass has already attained its local highest or local lowest position. Only in the case that the answer is "YES", the following step P2 is executed. If the answer is "NO" at step P1, the present routine is terminated. Alternatively, it is possible to use the proximity of the local highest or the local lowest position of the sprung mass as a standard of determination at step P1.

At step P2, the amount of change to the damping force of the shock absorber is successively determined based on the predetermined movement pattern of the sprung mass, thereby the damping force of the shock absorber is altered. It may be possible to calculate an acceleration pattern in response to the predetermined movement pattern of the sprung mass and thus to alter the damping force according to this acceleration pattern. Moreover, in order to swiftly restore the sprung mass from its local highest or local lowest position to the neutral position, the acceleration pattern may be predetermined based on a combination of a strictly increasing acceleration function f1(t) and a strictly decreasing acceleration function f2(t). Thus, the sprung mass in its local highest or local lowest position can be swiftly restored to the proximity of the neutral position by the strictly increasing acceleration function, and after this, it is gradually restored to the neutral position by the strictly decreasing acceleration function. The damping force can be discretely or continuously altered by controlling the flow of the work fluid of the shock absorber by opening or closing the control valve.

An outline of the operation of the present invention is as follows.

First of all, an ideal movement pattern of the sprung mass for restoring the sprung mass from its local highest or local lowest position to the neutral position is previously determined. When the vehicle runs on a road, if it is determined that the sprung mass has attained its local highest or local lowest position at step P1, the subsequent process step is executed. Namely, the movement that the sprung mass should take in the near future is estimated based on the predetermined movement pattern and the control amount for altering the damping force of the shock absorber is calculated to achieve the above-mentioned future movement. Thus, the damping force of the shock absorber is altered based on the control amount calculated at step P2. The process of step P2 is successively executed. As a result, the sprung mass actually moves to follow the above-mentioned movement pattern. When the sprung mass attains the neutral position, shake of the sprung mass never occurs. By presetting such a movement pattern that the sprung mass in its local highest or local lowest position can swiftly return to the neutral position in a semi-cycle as shown in a solid line 73 of FIG. 4A, the actual movement of the sprung mass follows this movement pattern.

BRIEF DESCRIPTION OF DRAWINGS

The present invention may be best understood by reference to the following description of a preferred embodiment and the drawings in which:

FIG. 5 is a table defining various movement constants of the sprung mass in response to a displacement of the sprung mass in its local highest or local lowest position in the first embodiment;

FIGS. 7A through 7E are diagrams for explaining the process steps 108 through 114 in the flow chart of FIG. 6A;

DETAILED DESCRIPTION OF PREFERRED EMBODIMENTS

Set forth below is an explanation of preferred embodiments of this invention based on the attached drawings.

Figure 1:
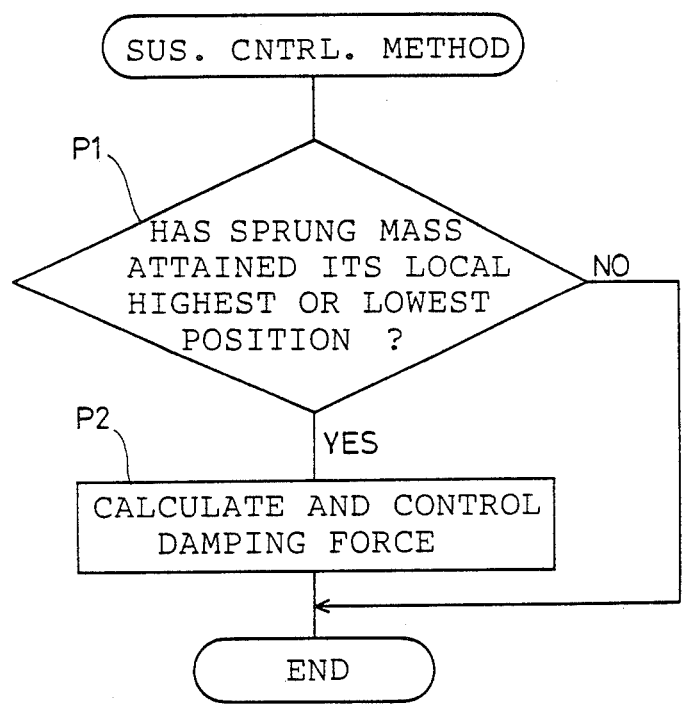
FIG. 1 is a flow chart showing the basic process steps of the present invention.
Figure 2:
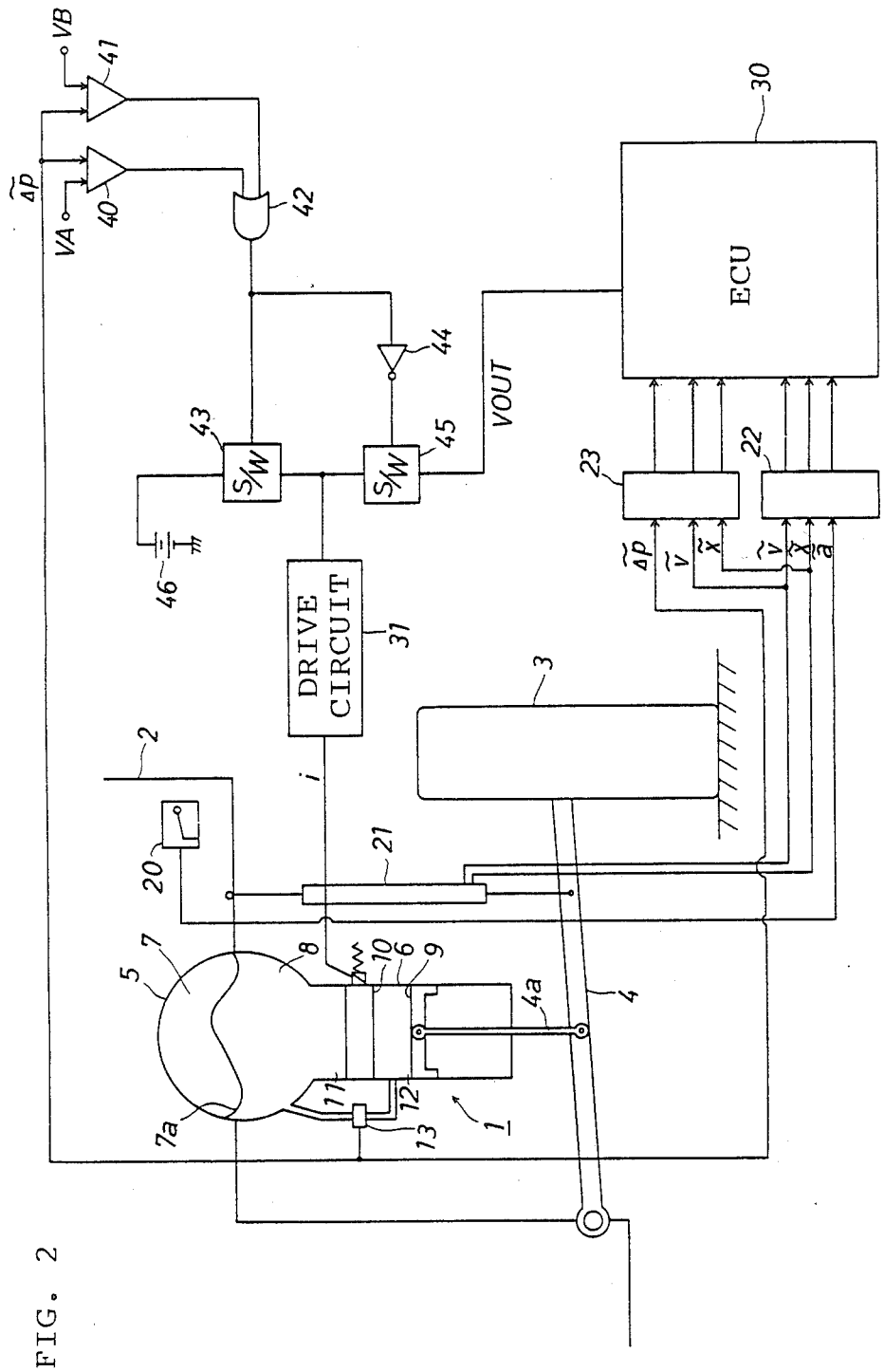
FIG. 2 is a system diagram showing a suspension system and the peripheral equipment of a vehicle in a first embodiment.

FIG. 2 shows a basic structure of the suspension system and the peripheral equipment of a vehicle utilizing the first embodiment of this invention. In the figure, a hydropneumatic suspension 1 including a gas spring and a fluid actuator is installed between a vehicle body 2 (sprung mass) and a suspension arm 4 which follows the movement of a wheel 3 (unsprung mass).

The hydro-pneumatic suspension 1 substantially consists of a spherical gas chamber 5 and a cylinder 6. In the spherical gas chamber 5, inert nitrogen (N$_2$) gas 7 is charged. The cylinder 6 retains oil 8 selected from those not vulnerable to temperature change. Nitrogen gas 7 and oil 8 are partitioned from each other by a diaphragm 7a. In the cylinder 6, a piston 9 which is connected to the suspension arm 4 via a rod 4a, and a flow control valve 10 for controlling flow of oil 8 which is compressed by the piston 9 to flow into the spherical gas chamber 5 are included. Moreover, a pressure sensor 13 is installed between an upper cylinder 11 and a lower cylinder 12 which are partitioned by the flow control valve 10. The pressure sensor 13 detects pressure differences between the upper and the lower cylinders 11 and 12. The hydro-pneumatic suspension 1, therefore, functions as a shock absorber whose damping force can be controlled by the flow control valve 10, and also functions as a spring by nitrogen gas 7 in the spherical gas chamber 5.

The acceleration sensor 20 for detecting acceleration in the vertical movement of the vehicle body 2 is mounted on the body 2. In addition, a speed/displacement sensor 21 is installed between the vehicle body 2 and the suspension arm 4 for detecting a distance between the body 2 and the suspension arm 4, i.e., body displacement, and its change rate, i.e., vertical speed of the body 2.

The acceleration $\bar{a}$ detected by the acceleration sensor 20, and the displacement $\bar{x}$ and the vertical speed $\bar{v}$ detected by the speed/displacement sensor 21 are inputted into the ECU 30 via a filter 22. The filter 22 passes only such a component of the displacement vibration which has a cycle time close to that of the resonant vibration of the sprung mass. Namely, the filter cuts those components close to the resonant vibration of the unsprung mass and other highfrequency noise vibrations. The signals inputted into the ECU 30 via the filter 22 indicates the sprung mass displacement. On the other hand, a pressure difference $\Delta \bar{p}$ detected by a pressure difference sensor 13, and the body displacement $\bar{x}$ and the vertical speed $\bar{v}$ detected by the speed/displacement sensor 21 pass through a filter 23 and then inputted into the ECU 30. The filter 23, in contrast to filter 22, are passes the component of the displacement vibration which has a cycle time close to that of the resonant vibration of sprung mass and that of the resonant vibration of unsprung mass. The filter 23 cuts all other high-frequency noise vibrations. The signals inputted into the ECU 30 via the filter 23 indicate relative displacement of the sprung mass in relation to the unsprung mass. The ECU 30 outputs signals to the drive circuit 31 for the flow control valve 10 for determining an opening of the flow control valve 10.

To cope with rapid movement of the unsprung mass (sudden up-and-down movement of the wheel), a special rapid movement circuit is utilized in this embodiment. This circuit includes a first comparator 40 for comparing a voltage signal $\Delta \bar{p}$ outputted from the pressure difference sensor 13 with a predetermined reference voltage VA, and a second comparator 41 for comparing the voltage signal $\Delta \bar{P}$ with a predetermined reference voltage VB. Each of the output terminals of the comparator 40 and the comparator 41 is connected to an input terminal of an OR gate 42. An output terminal of the OR gate 42 is connected to a first switch 43, and also to a second switch 45 via an inverter 44. One end of the first switch 43 is connected to a constant voltage source or a voltage-stabilizer circuit 46 and the other end is connected to the drive circuit 31. The switch 43 is switched ON and OFF according to the signal sent from the OR gate 42. Moreover, one end of the second switch 45 is connected to the output port of the ECU 30 and the other end is connected to the drive circuit 31. The switch 43 is switched ON and OFF according to the signal sent from the inverter 44.

Set forth below is an explanation of the above-mentioned rapid movement circuit. The voltage signal $\Delta \bar{P}$ indicating the pressure difference outputted from the pressure difference sensor 13 is set to take a positive value when the pressure in the upper cylinder 11 is larger than that in the lower cylinder 12. The aforementioned reference voltage VA is set to be such a value for starting control of the increase in the body-wheel distance, and it is in positive. If the position of the unsprung mass suddenly falls down, the pressure within the lower cylinder 12 becomes lower than the atmospheric pressure. Thus, the value of the voltage signal $\Delta \bar{P}$ outputted from the pressure difference sensor 13 becomes larger than the reference voltage VA, thereby the output value of the first comparator 40 becomes positive.

On the other hand, if the position of the unsprung mass is suddenly raised due to a sudden impact, the value of the voltage signal $\Delta \bar{P}$ detected by the pressure difference sensor 13 becomes lower than the reference voltage VB (negative) which is set to be such a value for starting control of decrease in the body-wheel distance. At this time, the output of the second comparator 41 becomes positive. Namely, when a sudden up-or-down movement of the unsprung mass occurs, either one of the input terminals of the OR gate 42 necessarily becomes positive, and a positive voltage is outputted from the OR gate 42. As a result, the first switch 43 is switched ON, and a constant output voltage VO of the voltage stabilizer circuit 46 is inputted into the drive circuit 31. Then, the flow control valve 10 is opened to communicate the path between the upper cylinder 11 and the lower cylinder 12 to cope with rapid movement of the unsprung mass. On the contrary, under the normal driving condition wherein a sudden up-and-down movement of the unsprung mass does not occur, both of the input terminals of the OR gate becomes zero, and the 0-voltage is outputted from the OR gate 42 via the inverter 44 to the second switch 45. As a result, the second switch 45 is switched ON. Thus, an output voltage VOUT is outputted from the ECU 30 and inputted into the drive circuit 31 so as to control the flow control valve 10. The control process executed by the ECU 30 is explained later.

Figure 3:
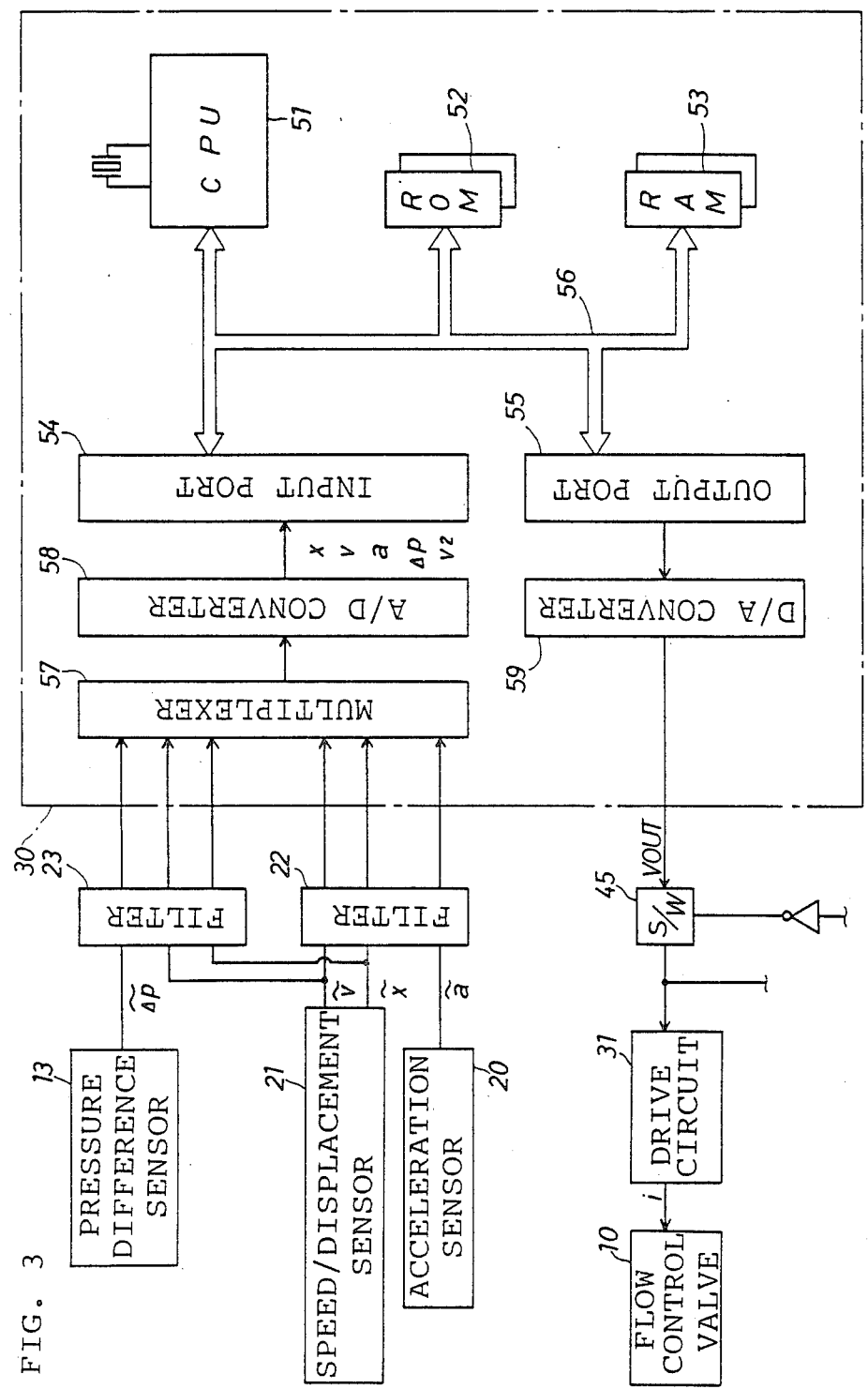
FIG. 3 is a block diagram illustrating the electronic controlled unit (ECU) in the first embodiment.

Next, the ECU 30 is hereinunder explained in reference with FIG. 3. The ECU 30 includes a CPU 51, a ROM 52 and a RAM 53 which form main parts of this circuit. Each of these elements is interconnected to an input port 54 and to an output port 55 via a bus 56. The CPU 51 receives and calculates various data detected by various sensors in accordance with a control program, and executes processes for controlling the flow control valve 10 of the hydro-pneumatic suspension 1. The ROM 52 previously stores the above-mentioned control program and initial data. The RAM 53 temporarily stores data which is necessary to the calculation of various data. The data detected by each of the aforementioned sensors is divided to time share by a multiplexer 57, and converted from analog to digital by an A/D converter 58, and then inputted into the input port 54. The signal outputted from the output port 55 is converted from digital to analog by a D/A converter 59, and then inputted into the drive circuit 31 as the VOUT signal.

Set forth below is an explanation of the control process for hydro-pneumatic suspension 1 executed by the ECU 30. In this process, it is required to preset an acceleration pattern in accordance with a predetermined ideal movement pattern or displacement pattern of the sprung mass. Details are described hereinunder.

Figure 4A:
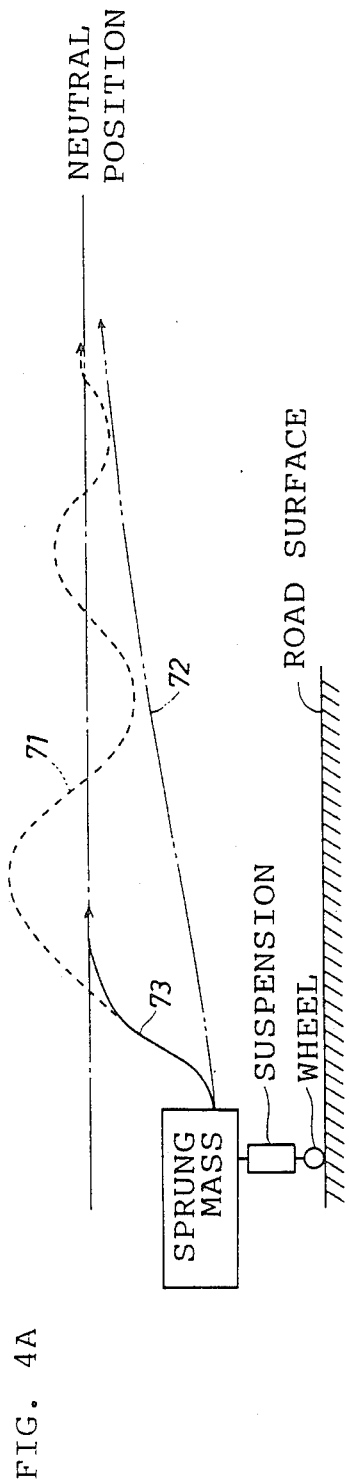
FIG. 4A is a graph indicating movement patterns of the sprung mass in the first embodiment.
Figure 4B:
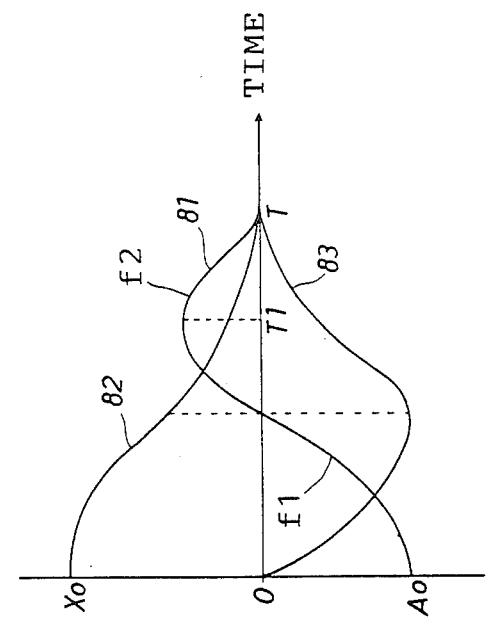
FIG. 4B is a graph indicating acceleration patterns in response to the movement patterns shown in FIG. 4A.

A solid line 73 in FIG. 4A shows one example of the movement pattern of the sprung mass for restoring the position of the sprung mass from its local lowest position to the neutral position as soon as possible in a semicycle. The acceleration pattern which is obtained by differentiating the above-mentioned displacement pattern twice in respect to time is shown by a solid line 81 in FIG. 4B. The solid line 82 indicates the displacement pattern of the sprung mass. Since the displacement is provided to be positive when the sprung mass is below its neutral position, the pattern of the solid line 82 is inversed with respect to the solid line 73. The solid line 83 shows the speed pattern of the sprung mass. The acceleration pattern 81 can be composed by connecting a strictly increasing acceleration function f1 and a strictly decreasing acceleration function f2 at a predetermined time point T1. The acceleration functions f1 and f2 can be defined as follows by the displacement XO and the acceleration AO of the sprung mass at its local lowest position and a desired time interval T for restoring the sprung mass to the neutral position.

If each of the values is defined as follows:

acceleration $\ddot{x} = f1(t)$ speed $\dot{x} = v1(t)$ displacement $x = x1(t)$ \hfill (1)

when $0 \leq t \leq T1$, and acceleration $\ddot{x} = f2(\tau)$ speed $\dot{x} = v2(\tau)$ displacement $x = x2(\tau)$ \hfill (2)

when $0 \leq \tau \leq T - T1$, the initial condition when the sprung mass is at its local lowest position is expressed as;

$$f1(0) = A0, \quad v1(0) = 0$$
$$X1(0) = X0 \hfill (3).$$

Since the function f1(t) and the function f2($\tau$) are connected at the predetermined time point T1, the continuation condition is as follows:

$$f1(T1) = f2(0) \equiv A1 \hfill (4)$$

$$v1(T1) = v2(0) \equiv V1 \hfill (5)$$

$$x1(T1) = x2(0) \equiv X1 \hfill (6).$$

When the sprung mass is restored to its neutral position, the termination condition is as follows:

$$f2(T - T1) = 0 \hfill (7)$$

$$v2(T - T1) = 0 \hfill (8)$$

$$x2(T - T1) = 0 \hfill (9).$$

Furthermore, the following formulas are realized.

$$v1(t) = \int_0^t f1(t)dt + v1(0) \hfill (10)$$
$$= \int_0^t f1(t)dt$$

$$v2(\tau) = \int_0^\tau f2(\tau)d\tau + v2(0) \hfill (11)$$
$$= \int_0^\tau f2(\tau)d\tau + V1$$

$$x1(t) = \int_0^t v1(t)dt + x1(0) \quad (12)$$

$$= \int_0^t v1(t)dt + X0$$

$$x2(\tau) = \int_0^\tau v2(\tau)d + x2(0) \quad (13)$$

$$= \int_0^\tau v2(\tau)d + X1$$

The number of explicit unknown variables are four, i.e., A1, V1, X1 and T1 and implicit unknown variables are included in the acceleration functions f1 and f2 in the above-mentioned formulas (4) through (9). Since there are six equations (4) through (9), all of the unknown variables can be calculated if the number of the unknown variables included in the functions f1 and f2 is equal to or less than two. Thus, the acceleration functions f1 and f2 can be defined in terms of two unknown variables.

Accordingly, the acceleration functions f1 and f2 including two or less than two unknown variables will be defined as follows. First, the restoration time point T when the sprung mass in its local lowest position attains the neutral position, is previously determined. Next, the displacement X0 of the sprung mass in its local lowest position is detected by the speed/displacement sensor 21. This displacement X0 is defined by the sprung mass component of the body-wheel distance vibration. Then, the initial acceleration A0 of the sprung mass in its local lowest position is optionally determined. As a result, the movement of the sprung mass may be determined.

In this embodiment, the above-mentioned equations are not actually solved each time while the sprung mass is moving, but the results of various calculations are previously stored in the ROM 52 of the ECU 30 and they are successively searched as occasion demands. Specifically, for each of previously determined $X0^i$ (i=1,...,n), $A0=A0(X0^i)$ and $T=T(X0^i)$, those values $T1(X0^i)$, $T2(X0^i)$, $A1(X0^i)$, $V1(X0^i)$, $X1(X0^i)$, $\lambda1(X0^i)$ and $\lambda2(X0^i)$ are respectively calculated beforehand based on the above-mentioned equations (4) through (9). Once calculated, these values constitute movement constants representative of the acceleration patterns. An example is shown in a table of FIG. 5. The variable $T2(X0^i)$ is obtained by subtracting $T1(X0^i)$ from $T(X0^i)$. The variables $\lambda1(X0^i)$ and $\lambda2(X0^i)$ are unknown variables which are included in the acceleration functions f1 and f2. By searching the $X0^i$ which is closest to the displacement of the sprung mass in its local highest or local lowest position, $A0(X0^i)$, $T(X0^i)$, $T1(X0^i)$, $T2(X0^i)$, $A1(X0^i)$, $V1(X0^i)$, $X1(X0^i)$, $\lambda1(X0^i)$ and $\lambda2(X0^i)$ are retrieved from the table. In this embodiment, the acceleration functions f1 and f2 are defined by a functional formula including two unknown variables $\lambda1$ and $\lambda2$ by previously selecting its type (e.g., a straight line, a parabola, and so on). The table in FIG. 5 can be previously stored in the ROM 52 after the functions f1 and f2 are defined.

Figure 6A:
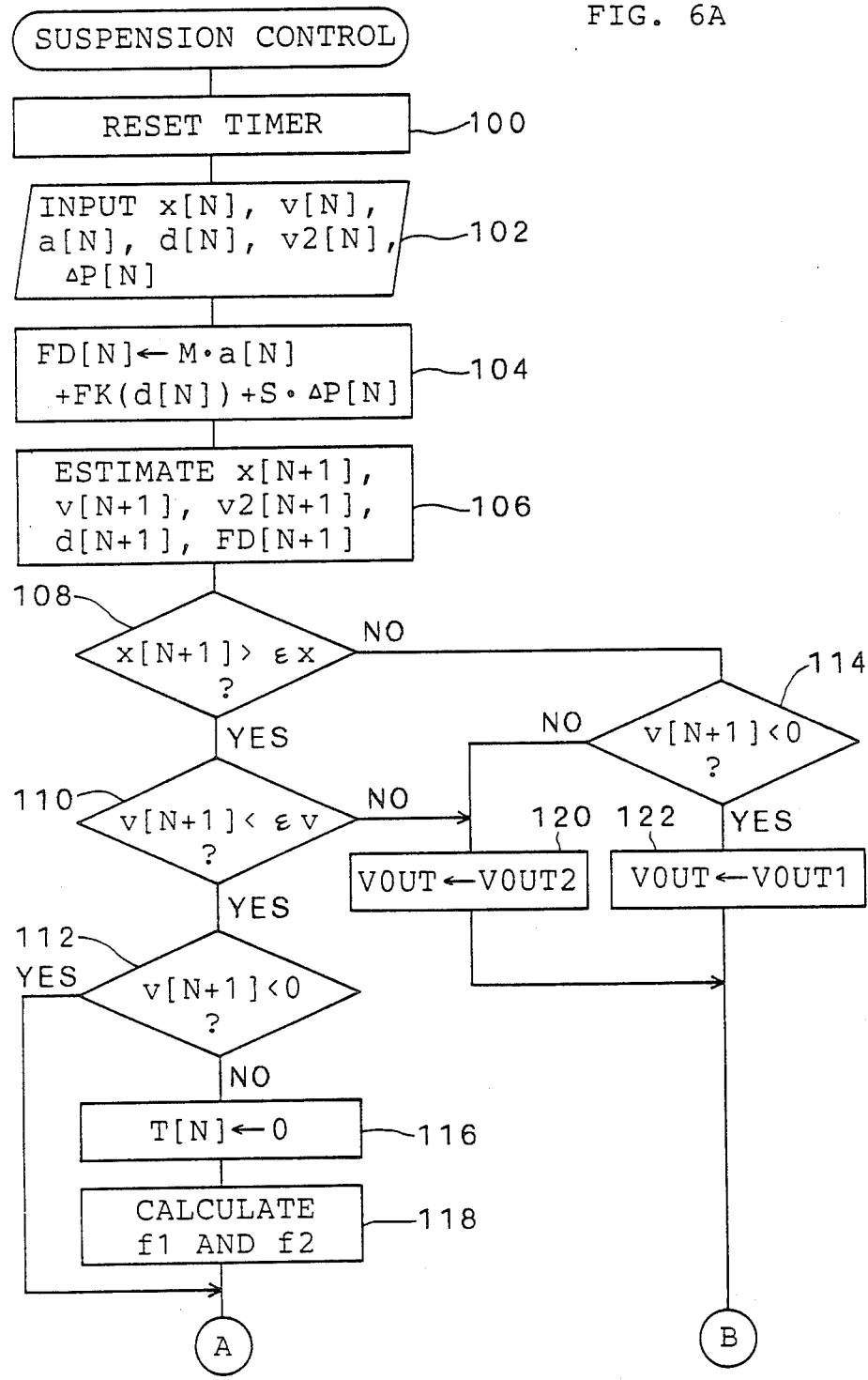
FIG. 6A and FIG. 6B are flow charts showing suspension control process steps executed by the ECU in the first embodiment.
Figure 6B:
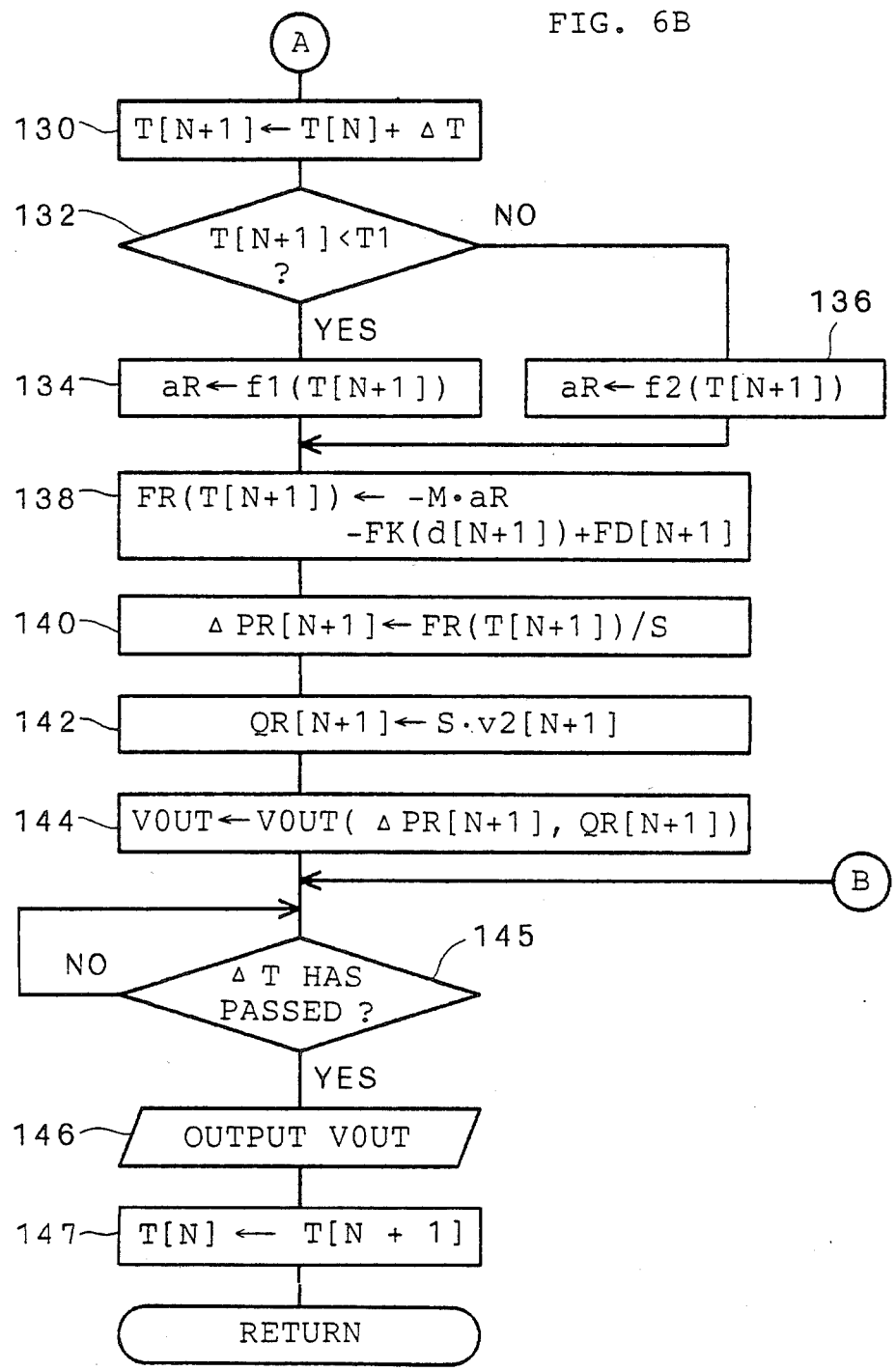

The process steps for controlling the hydropneumatic suspension 1 executed by the ECU 30 is explained hereinunder in reference with flow charts of FIGS. 6A and 6B.

When the program shown by the flow chart of FIG. 6A starts, a timer is reset at step 100. At the subsequent step 102, the following current values are inputted: sprung mass displacement x[N] inputted into the input port 54 via the filter 22, the multiplexer 57 and the A/D converter 58; sprung mass speed v[N]; sprung mass acceleration a[N]; a relative displacement d[N] inputted into the input port 54 via the filter 23, the multiplexer 57 and the A/D converter 58; relative speed v2[N]; and pressure difference ΔP[N].

At step 104, the current value of turbulent force FD due to lift force or strong wind affecting the sprung mass is calculated according to the formula (14).

$$FD[N] = M \cdot a[N] + FK(d[N]) - S \cdot \Delta P[N] \quad (14)$$

FD[N]: present value of turbulent force
M: sprung mass
FK: spring force determined by the present relative displacement d[N]
S: sectional area of the cylinder 6 of the hydropneumatic suspension 1

In the above formula, FK is obtained from the following formula (14)'.

$$FK(d[N]) = n \cdot S^2 \cdot PO \cdot d[N]/VO \quad (14)'$$

n: polytropic index
PO: pressure of $N_2$ gas 7 in the neutral position
VO: volume of $N_2$ gas 7 in the neutral position In the formula (14), the product of S and ΔP[N] presents the damping force. The current turbulent force FD affecting the sprung mass is calculated from the sprung mass acceleration a[N] and the sprung mass displacement x[N] inputted at step 102.

At step 106, processes are executed for estimating the sprung mass displacement x[N+1], the sprung mass speed v[N+1], the relative displacement x[N+1], the relative speed v2[N+1] and turbulent force FD[N+1], all of which are the values to be obtained after the time interval ΔT (the time interval required to accomplish the present routine once). For example, on the assumption that each of the above-mentioned values will change quadratically, the values are calculated in accordance with the following formulas (15) through (18).

$$x[N+1] = 3 \cdot x[N] - 3 \cdot x[N-1] + x[N-2] \quad (15)$$

$$d[N+1] = 3 \cdot d[N] - 3 \cdot d[N-1] + d[N-2] \quad (15)'$$

$$v[N+1] = 3 \cdot v[N] - 3 \cdot v[N-1] + v[N-2] \quad (16)$$

$$v2[N+1] = 3 \cdot v2[N] - 3 \cdot v2[N-1] + v2[N-2] \quad (17)$$

$$FD[N+1] = 3 \cdot FD[N] - 3 \cdot FD[N-1] + FD[N-2] \quad (18)$$

value [N−1]: the value detected ΔT before the current time
value [N−2]: the value detected 2·ΔT before the current time Those formulas (15) through (18) are derived in accordance with the following procedure. By the assumption, the values f(t) changes as $f(t) = a \cdot t^2 + b \cdot t + c$. Substituting as t[N]→0, t[N−1]→−h, and t[N−2]→−2h, here h=ΔT, three equations for three unknown variables a, b, and c are made;

$$f[N-2] = a \cdot (-2h)^2 + b \cdot (-2h) + c,$$

$$f[N-1] = a \cdot (-h)^2 + b \cdot (-h) + c, \text{ and}$$

$$f[N] = c.$$

From these three equations, a, b and c are given as:

$$a = (f[N] - 2 \cdot f[N-1] + f[N-2])/2h^2,$$

$$b = (3 \cdot f[N] - 4 \cdot f[N-1] + f[N-2])/2h, \text{ and}$$

$$c = f[N].$$

By substituting these variables into the basic equation, $f(t) = a \cdot t^2 + b \cdot t + c$, the estimation equation $$\begin{aligned} f[N+1] &= a \cdot h^2 + b \cdot h + c \\ &= 3 \cdot f[N] - 3 \cdot f[N-1] + f[N-2] \end{aligned}$$

is derived.

The values x[N+1] and v[N+1] estimated at step 106 are compared with various reference values at steps 108, 110, 112 and 114. At step 108, it is determined whether the estimated sprung mass displacement x[N+1] is greater than a predetermined small displacement $\epsilon x$ (e.g., $\epsilon x = 5$ mm). At step 110, it is determined whether the speed v[n+1] is smaller than the preset small value $\epsilon v$ (e.g., $\epsilon v = 0.01$ m/sec). At step 112, it is determined whether the speed v[N+1] is smaller than 0.

When the answer is 'YES' at step 108, 'YES' at step 110 and 'NO' at step 112, namely the condition corresponds to the region I $\{x[N+1] > \epsilon x\} \cap \{0 \leq v[N+1] < \epsilon V\}$ in FIG. 7F, it is determined that the sprung mass is in its local lowest position. Then, the process step proceeds to step 116 and to step 118. The processes executed at steps 116 and 118 are explained later.

On the other hand, when all of the answers at steps 108, 110 and 112 are 'YES', namely, the condition corresponds to the region II $\{x[N+1] > \epsilon x\} \cap \{v[N+1] < 0\}$ in FIG. 7F, it is determined that the sprung mass is below the neutral position and is rising upward as shown in FIG. 7B. In this case, the steps 116 and 118 are skipped and the program enters into the flow chart of FIG. 6B.

When the answer is 'YES' at step 108 and 'NO' at step 110, namely, the condition corresponds to the region III $\{x[N+1] > \epsilon x\} \cap \{v[N+1] \geq \epsilon v\}$, it is determined that the sprung mass is below the neutral position and is further sinking downward as shown in FIG. 7C. Then, the program proceeds to step 120, where the control signal VOUT for regulating the opening of the flow control valve 10 of the air suspension 1 is determined to be a preset voltage VOUT2. The signal is outputted from the output port 55 to the drive circuit 31 at step 146.

When the answer is 'NO' at step 108, and 'YES' at step 114, namely, the condition corresponds to a region IV $\{x[N+1] \leq \epsilon x\} \cap \{v[N+1] < 0\}$, it is determined that the sprung mass is substantially above the neutral position because x is a small value, and is further rising upward as shown in FIG. 7D. Then, the program proceeds to step 122, where the control signal VOUT for regulating the opening of the flow control valve 10 of the hydro-pneumatic suspension 1 is determined to be a preset voltage VOUT1.

When both of the answers are 'NO' at steps 108 and 114, namely, the condition corresponds to a region V $\{x[N+1] \leq \epsilon x\} \cap \{v[N+1] \geq 0\}$, it is determined that the sprung mass is substantially above the neutral position and is sinking downward as shown in FIG. 7E. Then, the process step proceeds to step 120.

Steps 116 and 118 are executed when the sprung mass is in its local lowest position. At step 116, the current time T[N] stored in the RAM 53 is cleared to zero. The sprung mass displacement x[N+1] estimated at step 106 is determined to be X0 (the displacement when the sprung mass is in its local lowest position). By utilizing the value x[N+1], the movement constants A0, T, T1, T2, A1, V1, X1, $\lambda 1$, $\lambda 2$ are derived from the table of FIG. 5 previously stored in the ROM 52 at step 118. In this case, the acceleration functions f1 and f2 are calculated or constructed from these movement constants.

Set forth below is an explanation of the flow chart of FIG. 6B.

When the answer is 'YES' at step 112 or after the process of step 118 is executed, the program proceeds to step 130 in FIG. 6B. At step 130, the next time point T[N+1] calculated by adding the time interval $\Delta T$ (the time interval required to accomplish the present routine once) to the current time T[N]. At the following step 132, it is determined whether or not the time T[N+1] is earlier than the time point T1 (a time point at which the functions f1 and f2 are connected) defined at step 118. If the answer is 'YES', i.e., T[N+1] < T1, the process step proceeds to step 134, where an acceleration aR to be required after the time interval $\Delta T$ is calculated by utilizing acceleration function f1 obtained at step 118. On the other hand, if the answer is 'NO' at step 132, i.e., T[N+1] $\geq$ T1, the process step proceeds to step 136, where an acceleration aR to be required after the time interval $\Delta T$ is calculated by utilizing the acceleration function f2.

At step 138, a damping force FR(T[N+1]) to be required after the time interval $\Delta T$ is calculated according to the following formula by utilizing the acceleration aR calculated at step 134 or 136.

$$FR(T[N+1]) = -M \cdot aR - FK(d[N+1]) + FD[N+1] \quad (19)$$

M: sprung mass
FK: spring force
FD: turbulent force

At step 140, the damping force FR(T[N+1]) is divided by the sectional area S of the cylinder 6 so as to calculate a pressure difference $\Delta PR[N+1]$ to be required after the time interval $\Delta T$. At the subsequent step 142, a flow amount QR[N+1] to be required after the time interval $\Delta T$ is calculated by multiplying the sectional area S by the relative speed v2[N+1] estimated at step 106.

At step 144, the opening of the flow control valve 10 of the hydro-pneumatic suspension 1 is determined. It is already known that the electric current 1 to be inputted into the flow control valve 10 correlates with the flow amount Q and the pressure difference $\Delta P$ of the hydro-pneumatic suspension 1. On the other hand, the electric current i is determined by the following formula (20):

$$i = G \cdot VOUT \quad (20),$$

where G indicates a voltage current transformation gain of the drive circuit 31. The control signal VOUT to be outputted from the output port 55 to the drive circuit 31, therefore, can be calculated by utilizing the pressure difference $\Delta PR[N+1]$ calculated at step 140 and the flow amount QR[N+1] obtained at step 142. At the following step 145, it is determined if the timer which was reset at step 100 has counted the time interval $\Delta T$. If the time interval $\Delta T$ has not elapsed yet, step 145 is repeated. If the time interval $\Delta T$ has elapsed, the process step proceeds to step 146. At step 146, the control signal VOUT is outputted to the drive circuit 31. However, if the value of the control signal VOUT has already set at step 120 or 122 in FIG. 6A, the processing step has proceeded to step 146 and the signal VOUT has been outputted to the drive circuit 31 without processing step 144. VOUT set at step 144 in case of regions I and II is variable according to the pressure difference and the flow amount so as to control the sprung mass to trace the predetermined movement for approaching the neutral position. On the other hand, VOUT1 and VOUT2 for setting VOUT at steps 122 and 120 in case of regions III, IV and V are constant for the simplicity of control because these cases are not closely related to the present control object. In general, however, VOUT1 is set smaller than VOUT2 in order to weaken the contracting-side damping force of the shock absorber compared with the expanding-side in order to efficiently absorb a wheel-rising shock. At step 147, the time T[N+1] is substituted for the current time T[N], and the present routine is once concluded. Then, the routine is restarted from step 100 after the preset time interval.

In these explanations, a case such that the sprung mass attains the local lowest position is described for an example to make this invention more understandable. It is a matter of course that similar process stepsexecuted for the opposite case, i.e., wherein the sprung mass is at its local highest position.

In this embodiment, several kinds of acceleration pattern of the sprung mass for restoring the sprung mass from its local lowest position to the neutral position have been prepared in response to several displacements X0 of the sprung mass in its local lowest position. The above-mentioned control routine is executed while the vehicle is moving. When it is estimated that the sprung mass will attain its local lowest position in the nearest future, an ideal acceleration pattern is selected by utilizing an estimated displacement x of the sprung mass (step 118). In accordance with this acceleration pattern, the control signal VOUT is outputted to the drive circuit 31. As a result, the present embodiment can provide an ideal acceleration pattern in that the sprung mass in its local lowest position is swiftly restored toward the neutral position until the predetermined time point T1 (<T), and after that, the sprung mass is gradually restored to the neutral position. Namely, the sprung mass in its local lowest position can be effectively restored to the neutral position in a semi-cycle, thereby the riding comfort can be improved.

As mentioned before, a special rapid circuit is utilized in this embodiment so as to cope with rapid movement of the unsprung mass. This is helpful for enabling the sprung mass to follow the ideal acceleration pattern.

At step 145, a time interval $\Delta A$ from the time point when the control signal VOUT is outputted to the time point when the operation of the flow control valve 10 is actually concluded may be considered. Therefore, it is possible to use the time interval $\Delta T - \Delta A$ instead of $\Delta T$ at step 145. In this case, even higher suspension control accuracy can be realized.

Another embodiment of the invention is now explained.

Figure 8:
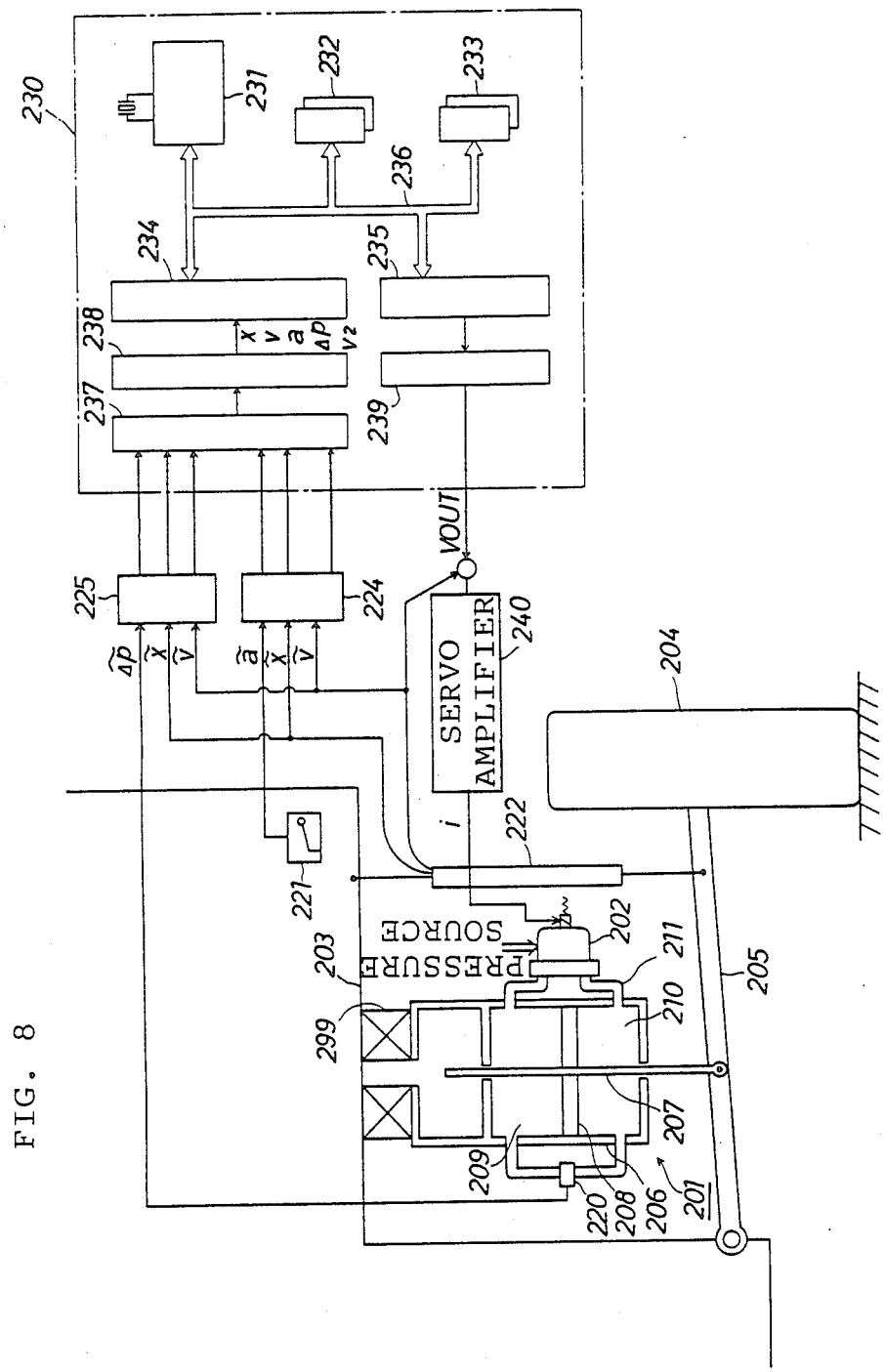
FIG. 8 is a diagramatic view showing a suspension system and the peripheral equipment of a vehicle including a block diagram of an ECU in a second embodiment.

FIG. 8 is a diagramatic view showing a suspension system and its peripheral equipment utilizing the second embodiment of the present suspension control method and a block diagram of an ECU. In this figure, numeral 201 illustrates a suspension utilizing a servo valve 202, and the suspension is installed between a vehicle body 203 and a suspension arm 205 which follows a vertical movement of a wheel 204.

A cylinder 206 of the suspension 201 is divided into an upper chamber 209 and a lower chamber 210 by a piston 208 which is connected to the suspension arm 205 via a rod 207. The upper chamber 209 and the lower chamber 210 are connected with each other by a path 211. A servo valve 202 for controlling the opening of the path 211 is formed at about the halfway point of the path 211. The servo valve 202 controls the flow to the cylinder 206 corresponding to the control current i so as to alter the damping force of the suspension 201. Moreover, a pressure difference sensor 220 is installed between the upper chamber 209 and the lower chamber 210.

As in the first embodiment, an acceleration sensor 221 and a speed/displacement sensor 222 are mounted on the vehicle body 203.

An acceleration $\bar{a}$ detected by the acceleration sensor 221 and a relative displacement $\bar{x}$ and a relative speed $\bar{v}$ detected by the speed/displacement sensor 222 are inputted into the ECU 230 via a filter 224 which passes only the sprung mass component. Moreover, the above-mentioned relative displacement $\bar{x}$, relative speed $\bar{v}$ and a pressure difference $\Delta \bar{P}$ detected by the pressure difference sensor 220 are also inputted into the ECU 230 via a filter 225 which passes not only the sprung mass component but also the unsprung mass component.

The ECU 230 includes a CPU 231, a ROM 232, a RAM 233, an input port 234 and an output port 235, each of which is interconnected via a bus 236 as in the first embodiment. The ECU 230 further includes a multiplexer 237, an A/D converter 238 and a D/A converter 239. The ECU 230 receives various signals transmitted from various sensors, processes them, and outputs control signal VOUT via the output port 235 for controlling the servo valve 202.

The control signal VOUT outputted from the ECU 230 is inputted into a servo amplifier 240. In the servo amplifier 240, the control signal VOUT is compared with a feed-back signal (the relative speed v detected by the speed/displacement sensor 222) so as to produce a deviation signal. The deviation signal is converted into an electric current i, and then outputted into the servo valve 202. Namely, the servo system functions to automatically correct the deviation between the signal VOUT and the feed-back signal.

Moreover, as in the first embodiment, the ROM 232 of the ECU 230 stores a table which is for determining the movement constants of acceleration functions g1 and g2; A0, T, T1, T2, A1, V1, X1, $\lambda 1$, $\lambda 2$ in response to the displacement X0 of the sprung mass in the local highest or lowest position of the sprung mass.

Figure 9A:
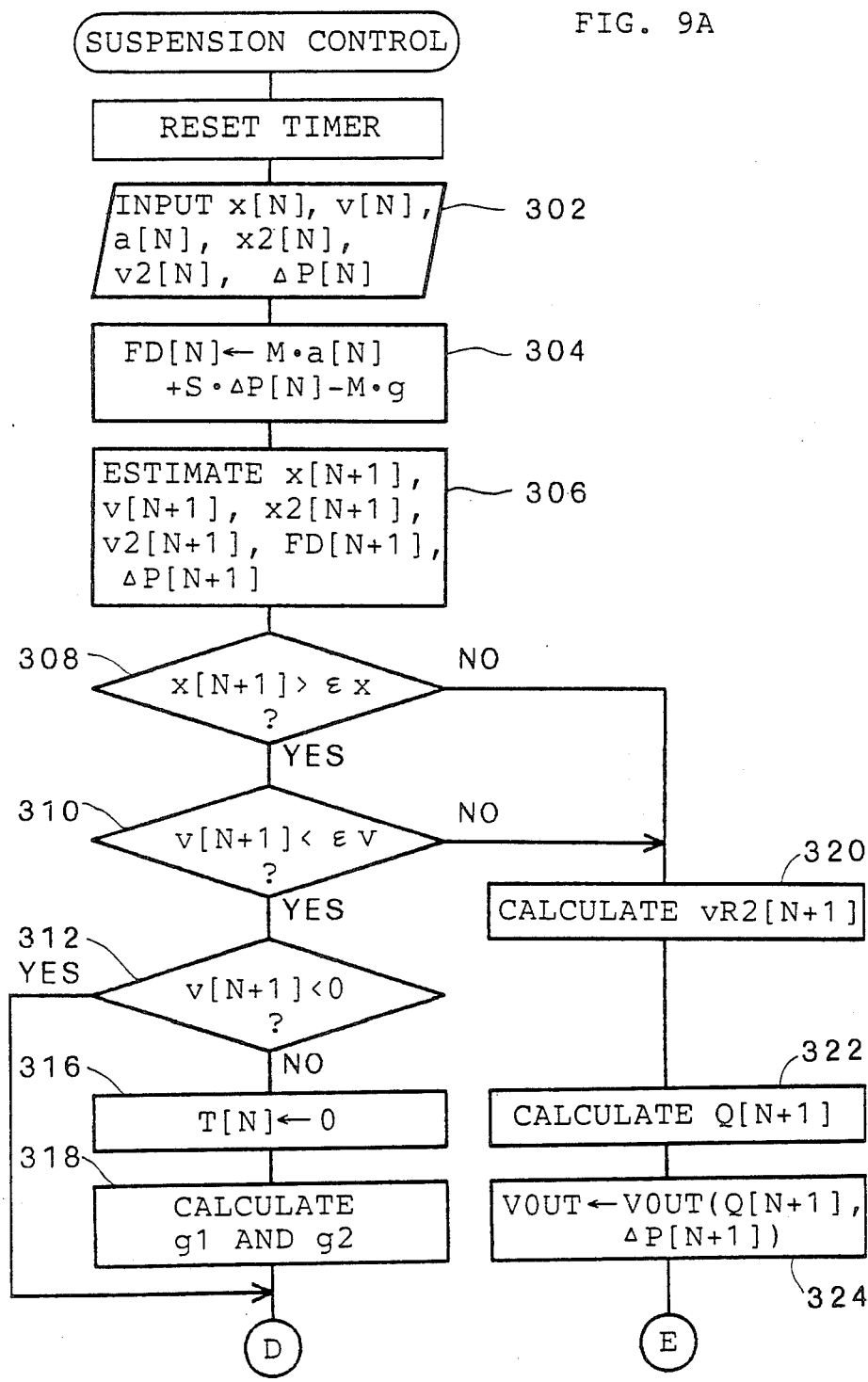
FIG. 9A and FIG. 9B are flow charts of a suspension control process routine executed in the ECU of the second embodiment.
Figure 9B:
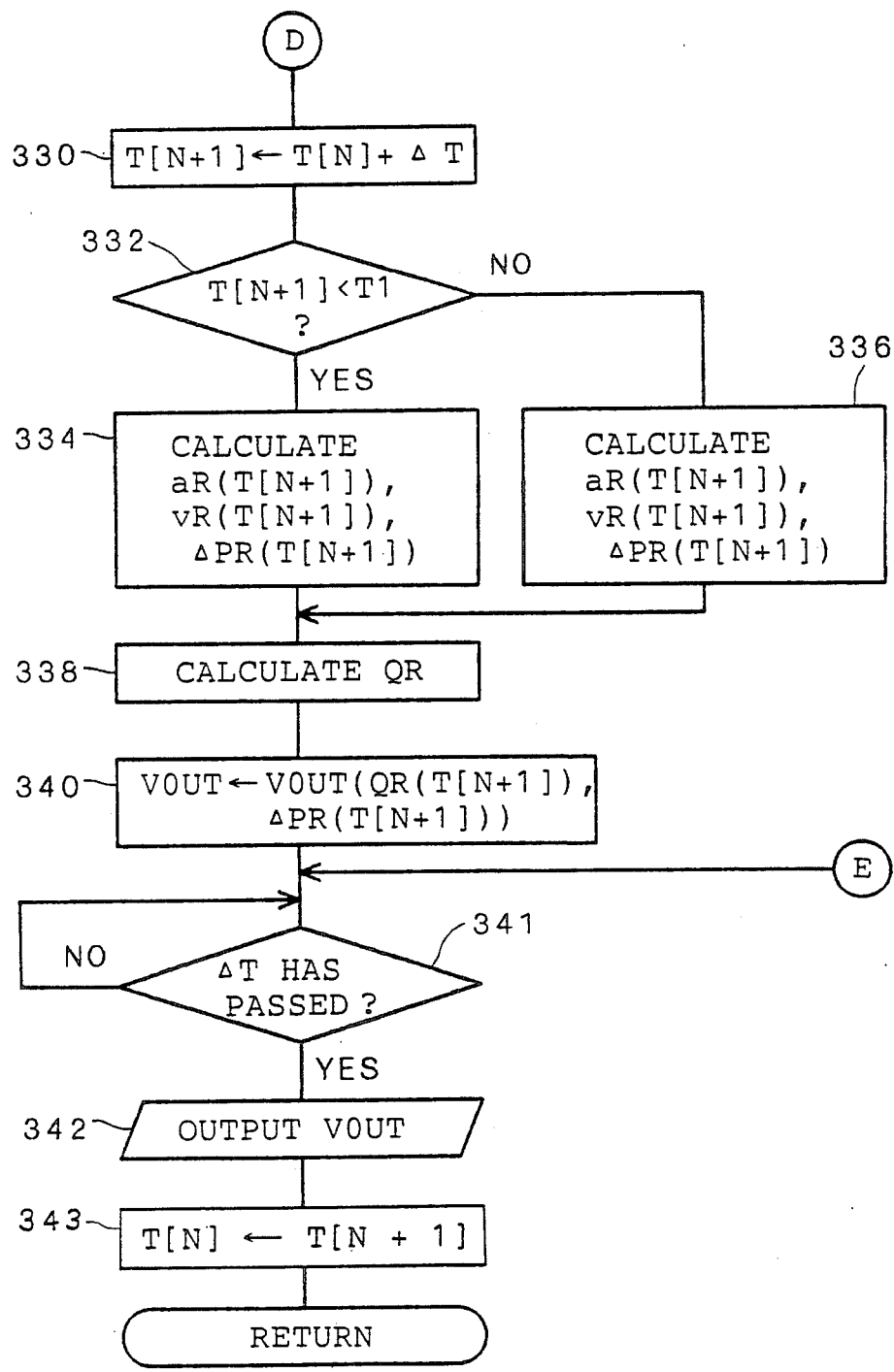

The control process for the suspension 201 executed by the ECU 230 is hereinunder described in reference with flow charts of FIG. 9A and FIG. 9B. In this control process, processing steps which are same as or similar to those in the first embodiment are only briefly explained. The step numbers in parentheses denote the reference steps in the first embodiment.

When the program is started, a timer is reset at step 300. At the subsequent step 302, current values of sprung mass displacement x[N], sprung mass speed v[N], sprung mass acceleration a[N], relative displacement x2[N], relative speed v2[N] and pressure difference ΔP[N] are inputted from respective sensors (ref: step 102). At step 304, a current turbulent force FD[N] is calculated according to the following formula (21) (ref: step 104).

$$FD[N] = M \cdot a[N] + S \cdot \Delta P[N] - M \cdot g \quad (21)$$

M: sprung mass
S: sectional area of the cylinder 206

At step 306, values after a time interval ΔT are estimated concerning sprung mass displacement x[N+1], sprung mass speed v[N+1], relative displacement x2[N+1], turbulent force FD[N+1] and pressure difference ΔP[N+1] (ref: step 106).

At step 308, 310 and 312, the above-estimated values x[N+1] and v[N+1] are compared with the ϵx and ϵv (ref: steps 108, 110, 112). If the resultant condition is within a range {x[N+1]>ϵx} ∩ {0≦v[N+1]<ϵv}, it is determined that the sprung mass is in its local lowest position, and the time T[N] is cleared to zero at step 316 (ref: step 116). At the subsequent step 318, an appropriate set of movement constants in response to the displacement of the sprung mass in its local lowest position is selected from the table stored in the ROM 302 so as to calculate the acceleration functions g1 and g2 (ref: step 118). Then, the program proceeds to step 330 in FIG. 9B.

On the other hand, if the resultant condition is within a range of {x[N+1]>ϵx} ∩ {v[N+1]<0}, steps 316 and 318 are skipped and the program proceeds to step 330 in FIG. 9B.

Moreover, if it is determined the resultant condition is x[N+1]≦ϵx at step 308 or v[N+1]≧ϵv at step 310, the program proceeds to step 320. At step 320, the relative speed vR2[N+1] is calculated. The procedure is as follows. Since the movement of the sprung mass is expressed by the following formula (22), $$k \cdot x2 + c \cdot vR2 = S \cdot \Delta P \quad (22)$$

k: set spring constant
c: set damping coefficient
the relative speed of the sprung mass in respect to the unsprung mass vR2[N+1] is calculated as follows:

$$vR2[N+1] = (S \cdot \Delta P[N+1] - k \cdot d[N+1])/c \quad (23)$$

At step 322, a flow amount Q[N+1] to be required at the time point T[N+1] is calculated by utilizing vR2[N+1] calculated at step 320.

$$\begin{aligned} Q[N+1] &= S \cdot vR[N+1] \\ &= S \cdot (S \cdot \Delta P[N+1] - k \cdot d[N+1])/c \end{aligned} \quad (24)$$

At step 324, the voltage of the control signal VOUT for controlling the servo valve 202 is calculated based on the relation between the required flow amount Q[N+1] obtained at step 322 and the pressure difference ΔP[N+1] estimated at step 306. Then, the program proceeds to step 342.

At step 330, the next time point T[N+1] is obtained by adding the processing time interval ΔT (the time interval required to accomplish the present routine once) to the present time T[N] (ref: step 130). At the following step 332, it is determined if the time point T[N+1] is before the time point T1 which is set at step 318 (ref: step 132). If the result is 'YES', namely, the result is T[N+1]<T1, the program proceeds to step 334.

At step 334, a sprung mass acceleration aR(T[N+1]), a sprung mass speed vR(T[N+1]), and a pressure difference ΔPR(T[N+1]) to be required at the time point T[N+1] are calculated according to the following formulas (25) through (27).

$$aR(T[N+1]) = g1(T[N+1]) \quad (25)$$

$$vR(T[N+1]) = \int_0^{T[N+1]} g1(t)dt \simeq \quad (26)$$

$$v[N] + \Delta T \cdot g1(T[N])$$

$$\Delta PR(T[N+1]) = \{FD[N+1] - M \cdot aR(T[N+1]) + M \cdot g\}/S \quad (27)$$

On the other hand, if the result of step 332 is 'NO', the process step proceeds to step 336, where aR(T[N+1]), vR(T[N+1]) and ΔPR(T[N+1]) are calculated by the following formulas (28) through (30).

$$aR(T[N+1]) = g2(T[N+1] - T1) \quad (28)$$

$$vR(T[N+1]) = V1 + \int_0^{T[N+1]-T1} g2(\tau)d\tau \simeq \quad (29)$$

$$V[N] + \Delta T \cdot g2(T[M] - T1)$$

$$\Delta PR(T[N+1]) = \{FD[N+1] - M \cdot aR(T[N+1]) + M \cdot g\}/S \quad (30)$$

At step 338, a flow amount QR(T[N+1]) to be required at the time point T[N+1] is calculated by subtracting the unsprung mass speed from the relative speed of sprung mass vR(T[N+1]) calculated at step 334 or 336.

$$QR(T[N+1]) = \{vR(T[N+1]) - (v[N+1] - v2[N+1])\} \cdot S \quad (31)$$

At step 340, the value of the control signal VOUT for driving the servo valve 202 is calculated based on the relation between the flow amount QR(T[N+1]) calculated at step 338 and the pressure difference ΔPR(T[N+1]) calculated at step 334 or 336. At the subsequent step 341, it is determined if the timer has counted the time interval ΔT (ref: step 145). If the time interval ΔT has elapsed, the control signal VOUT defined at step 340 is outputted (ref: step 324). In the flow chart of FIG. 9A, after step 324, the program proceeds to step 342 so as to output the control signal VOUT. Then, at step 343, the time T[N+1] is substituted for the current time T[N], and the present routine is once concluded.

The effect of the second embodiment is similar to that of the first embodiment in that the sprung mass in its local lowest position is swiftly restored toward the neutral position until the predetermined time point T1 (<T), and after that, the sprung mass is gradually restored to the neutral position. Thus, an ideal acceleration pattern is obtained so as to effectively restore the sprung mass to the neutral position within a semi-cycle. As a result, riding comfort can be improved.

Since the servo valve 202 has high responsiveness in the second embodiment, it can cope with quick movement of the unsprung mass, thereby the sprung mass can follow the above-mentioned ideal acceleration pattern.

Moreover, in the second embodiment, it is possible to use a load sensor 299 shown in FIG. 8 instead of the pressure difference sensor 220 so as to detect the pressure difference ΔP.

Obviously, numerous modifications and variations of the present invention are possible in the light of the above teachings. It is therefore to be understood that within the scope of the appended claims, the invention may be practiced otherwise than as specifically described herein.

What is claimed is:

1. A method for controlling a suspension of a vehicle equipped with a variable damping force shock absorber, said method comprising the steps of:
    predetermining a plurality of movement patterns, said movement patterns each depicting an ideal movement patterns of a sprung mass of the vehicle from a time point when the sprung mass attains one of various local highest and local lowest positions with respect to a neutral position, to a time point when the sprung mass reaches said neutral position;
    sequentially generating a control signal for altering the damping force of the shock absorber so that the spring mass traces one of said predetermined movement patterns after the sprung mass has attained substantially said one of various local highest and local lowest positions; and
    controlling thereby the shock absorber responsive to said control signal.

2. The method according to claim 1, wherein:
    each of said movement patterns is predetermined to correspond to one of a plurality of said various local highest positions or to one of a plurality of said local lowest positions of the sprung mass;
    every said movement patterns comprises at least one of a strictly increasing function, said increasing function corresponding to said one of a plurality of various local lowest positions, and a strictly decreasing function, said decreasing function corresponding to said one of a plurality of various local highest positions; and
    the control signal is generated based on one of said movement patterns.

3. The method according to claim 2, wherein each of said movement patterns comprises an acceleration function which is a second derivative of a corresponding ideal position function of said sprung mass.

4. The method according to claim 3, wherein:
    each of said acceleration functions comprises two sequentially interconnected functions, wherein
    when the acceleration function corresponds to said one of a plurality of various local lowest positions, the first function is strictly increasing function and the second function is a strictly decreasing function, and
    when the acceleration function corresponds to said one of a plurality of various local highest position, the first function is a strictly decreasing function and the second function is a strictly increasing function; and
    the component functions are characterized by no more than two variables.

5. The method according to claim 4, wherein:
    each of said acceleration functions is represented by set of movement constants;
    said set of movement constants is stored in a memory of an electronic control unit;
    the movement constants are retrieved from a memory location of said memory addressed in correspondence to the one of said plurality of various local highest or local lowest positions most closely approximating the local highest or local lowest position attained by the sprung mass.

6. An apparatus for controlling a suspension of a vehicle equipped with a variable damping force shock absorber, said apparatus comprising:
    memory means for storing a plurality of preset movement patterns, each movement pattern depicting a movement of the sprung mass of the vehicle from a time point when the sprung mass attains one of various local highest and local lowest positions with respect to a neutral position, to a time point when the sprung mass reaches the neutral position;
    means for detecting that the sprung mass is in substantially a local highest position or local lowest position and for generating respective corresponding signals; and
    means responsive to each of said signals for sequentially generating a control signal for altering the damping force of the shock absorber such that the sprung mass traces one of the preset movement patterns after the sprung mass attains one of said various local highest or said local lowest positions.

* * * * *